US012482970B2

(12) United States Patent
Burris et al.

(10) Patent No.: US 12,482,970 B2
(45) Date of Patent: Nov. 25, 2025

(54) BULLET-TYPE CONNECTORS, PRINTED CIRCUIT BOARD ASSEMBLIES, AND METHODS

(71) Applicant: CORNING OPTICAL COMMUNICATIONS RF LLC, Glendale, AZ (US)

(72) Inventors: Donald Andrew Burris, Peoria, AZ (US); Thomas Edmond Flaherty, IV, Surprise, AZ (US)

(73) Assignee: CORNING OPTICAL COMMUNICATIONS RF LLC, Glendale, AZ (US)

(*) Notice: Subject to any disclaimer, the term of this patent is extended or adjusted under 35 U.S.C. 154(b) by 468 days.

(21) Appl. No.: 17/965,448

(22) Filed: Oct. 13, 2022

(65) Prior Publication Data

US 2023/0118648 A1 Apr. 20, 2023

Related U.S. Application Data

(60) Provisional application No. 63/257,142, filed on Oct. 19, 2021.

(51) Int. Cl.

| | |
|---|---|
| ***H01R 12/71*** | (2011.01) |
| ***H01R 13/50*** | (2006.01) |
| ***H01R 13/62*** | (2006.01) |
| ***H01R 43/20*** | (2006.01) |
| *H01R 101/00* | (2006.01) |

(52) U.S. Cl.
CPC ........... *H01R 12/716* (2013.01); *H01R 13/50* (2013.01); *H01R 13/62* (2013.01); *H01R 43/205* (2013.01); *H01R 2101/00* (2013.01)

(58) Field of Classification Search
CPC ..... H01R 24/50; H01R 12/716; H01R 43/205
USPC .............................................. 439/63, 66, 74
See application file for complete search history.

(56) References Cited

U.S. PATENT DOCUMENTS

| | | | | |
|---|---|---|---|---|
| 3,363,221 | A | 1/1968 | Stark | |
| 4,925,403 | A | 5/1990 | Zorzy | |
| 5,183,412 | A | 2/1993 | Nagafuji | |
| 6,827,608 | B2 | 12/2004 | Hall et al. | |
| 7,607,942 | B1 | 10/2009 | Van Swearingen | |
| 9,059,545 | B2 * | 6/2015 | Mason | H01R 13/2421 |
| 10,276,949 | B2 | 4/2019 | Lee et al. | |
| 11,063,394 | B2 | 7/2021 | Tsao et al. | |
| 2006/0172561 | A1 * | 8/2006 | Clark | H01R 24/50 439/63 |

(Continued)

FOREIGN PATENT DOCUMENTS

| | | | |
|---|---|---|---|
| EP | 1547203 | A1 | 6/2005 |
| EP | 2817852 | A2 | 12/2014 |

(Continued)

*Primary Examiner* — Phuong K Dinh
(74) *Attorney, Agent, or Firm* — Tamika A. Crawl-Bey

(57) ABSTRACT

A bullet-type connector includes an axially compressible housing, a central conductor, and a dielectric mount. The axially compressible housing is compressible in an axial direction at least 2.5% of an overall length of the axially compressible housing. The central conductor defines a first female connecting end and a second female connecting end, the central conductor being positioned within the axially compressible housing. The dielectric mount mounts the central conductor within the axially compressible housing.

19 Claims, 5 Drawing Sheets

(56) References Cited

U.S. PATENT DOCUMENTS

2010/0159718 A1* 6/2010 Duquerroy ............. H01R 12/75
439/66

FOREIGN PATENT DOCUMENTS

| | | | |
|---|---|---|---|
| WO | 2004/019452 | A1 | 3/2004 |
| WO | 2011/127864 | A2 | 10/2011 |
| WO | 2013/126629 | A2 | 8/2013 |
| WO | 2020/106215 | A1 | 5/2020 |
| WO | 2021/257363 | A1 | 12/2021 |

* cited by examiner

BULLET-TYPE CONNECTORS, PRINTED CIRCUIT BOARD ASSEMBLIES, AND METHODS

BACKGROUND

This application claims the benefit of priority under 35 U.S.C. § 119 of U.S. Provisional Application No. 63/257,142, filed Oct. 19, 2021, the content of which is relied upon and incorporated herein by reference in its entirety.

BACKGROUND

The present specification generally relates to bullet-type connectors, printed circuit board (hereinafter "PCB") assemblies, and methods and, more specifically, to bullet-type connectors having increased flexibility for improved assembly of PCB assemblies.

A bullet-type connector may also be referred to as a blind-mate connector, a coaxial connector, or the like. Such connectors, which may be used for signal transmission, are generally characterized by their relatively small size, which may be a consequence of operation frequency but also particular applications and systems in which these connectors are employed. For example, these connectors and related PCB assemblies may be found in sophisticated aircraft in which the size and weight restrictions urge reduction in weight and size of electronic assemblies to the extent reasonably possible. Unfortunately, bullet-type connectors may be generally characterized by rigid bodies which are resistant to the application of axial loads, leading to tight engineering tolerances, increased manufacturing costs, and assembly challenges.

Accordingly, a need exists for alternative and more flexible bullet-type connectors to improve ease of assembly, manufacturing costs, and resilience to applied stresses.

SUMMARY

Bullet-type connectors having improved flexibility, resulting in improved assembly, manufacturing costs, and resilience are disclosed herein In a first aspect A1, a bullet-type connector includes an axially compressible housing, a central conductor, and a dielectric mount. The axially compressible housing is compressible in an axial direction at least 2.5% of an overall length of the axially compressible housing. The central conductor defines a first female connecting end and a second female connecting end, the central conductor being positioned within the axially compressible housing. The dielectric mount mounts the central conductor within the axially compressible housing.

In a second aspect A2 according to the first aspect A1, the axially compressible housing comprises a plastic body coated with one or more conductive layers. In a third aspect A3 according to the second aspect A2, the one or more conductive layers comprise copper, nickel, gold, or any combination thereof. In a fourth aspect A4 according to any of the second through third aspects A2-A3, the one or more conductive layers are at least 0.1 μm thick or greater. In a fifth aspect A5 according to any of the second through fourth aspects A2-A4, the one or more conductive layers comprise at least two metallic layers. In a sixth aspect A6 according to the fifth aspect A5, each of the at least two metallic layers is a different metal. In a seventh aspect A7 according to any preceding aspect, the axially compressible housing extends longitudinally beyond first female connecting end and a second female connecting end of the central conductor in an uncompressed configuration. In an eighth aspect A8 according to any preceding aspect, the axially compressible housing comprises a first tapered portion and a second tapered portion, wherein a diameter of the first tapered portion and a diameter of the second tapered portion tapers from a first diameter to a second diameter smaller than the first diameter.

In a ninth aspect A9 according to any preceding aspect, the axially compressible housing comprises a plastic body coated with one or more conductive layers, and the axially compressible housing extends longitudinally beyond a first female connecting end and a second female connecting end of the central conductor in an uncompressed configuration. In a tenth aspect A10 according to any preceding aspect, the axially compressible housing comprises a plastic body coated with one or more conductive layers, and the axially compressible housing comprises a first tapered portion and a second tapered portion, wherein a diameter of the first tapered portion and a diameter of the second tapered portion tapers from a first diameter to a second diameter smaller than the first diameter. In an eleventh aspect A11 according to any preceding aspect, the axially compressible housing extends longitudinally beyond a first female connecting end and a second female connecting end of the central conductor in an uncompressed configuration, and the axially compressible housing comprises a first tapered portion and a second tapered portion, wherein a diameter of the first tapered portion and a diameter of the second tapered portion tapers from a first diameter to a second diameter smaller than the first diameter. In an twelfth aspect A12 according to any preceding aspect, the axially compressible housing comprises a plastic body coated with one or more conductive layers, the axially compressible housing extends longitudinally beyond the first female connecting end and the second female connecting end of the central conductor in an uncompressed configuration, and the axially compressible housing comprises a first tapered portion and a second tapered portion, wherein a diameter of the first tapered portion and a diameter of the second tapered portion tapers from a first diameter to a second diameter smaller than the first diameter.

In a thirteenth aspect A13, a PCB assembly includes a first PCB, a second PCB, and a bullet-type connector. The first PCB comprises a first male connector. The second PCB comprises a second male connector. The bullet-type connector includes an axially compressible housing compressible in an axial direction at least 2.5% of an overall length of the axially compressible housing, a central conductor defining a first female connecting end connected to the first male connector and a second female connecting end connected to the second male connector, the central conductor being positioned within the axially compressible housing, and a dielectric mount mounting the central conductor within the axially compressible housing.

In a fourteenth aspect A14 according to the thirteenth aspect A13, the first PCB is arranged parallel to the second PCB and the bullet-type connector extend between the first PCB and the second PCB. In a fifteenth aspect A15 according to any preceding aspect, the first PCB and the second PCB compress the bullet-type connector therebetween.

In a sixteenth aspect A16, a method of assembling a printed circuit board (PCB) assembly including a first PCB, a second PCB, and a plurality of bullet-type connectors includes attaching the first PCB including a first plurality of male connectors to a first end the plurality of bullet-type connectors, attaching the second PCB including a second plurality of male connectors to a second end of the plurality of bullet-type connectors, and compressing one or more of the plurality of bullet-type connectors between the first PCB and the second PCB to meet a predetermined fitting condition of the plurality of bullet-type connectors with the first PCB and the second PCB.

In a seventeenth aspect A17 according to the sixteenth aspect, the predetermined fitting condition comprises a minimum spacing of the plurality of bullet-type connectors to the first PCB and the second PCB. In an eighteenth aspect A18 according to any preceding aspect, the one or more of the plurality of bullet-type connectors comprise an axially compressible housing compressible in an axial direction at least 2.5% of an overall length of the axially compressible housing. In a nineteenth aspect A19 according to any preceding aspect, the attaching the first PCB to the plurality of bullet-type connectors comprises inserting the first plurality of male connectors into first female connecting end of a central conductor of the plurality of bullet-type connectors, and the attaching the second PCB to the plurality of bullet-type connectors comprises inserting the second plurality of male connectors into a second female connecting end of the central conductor of the plurality of bullet-type connectors. In a twentieth aspect A20 according to any preceding aspect, each of the plurality of bullet-type connectors comprises an axially compressible housing compressible in an axial direction at least 2.5% of an overall length of the axially compressible housing, a central conductor defining a first female connecting end and a second female connecting end, the central conductor being positioned within the axially compressible housing, and a dielectric mount mounting the central conductor within the axially compressible housing.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the figures, an embodiment of the bullet-type connector is generally depicted. The bullet-type connector may generally include an axially compressible housing, a central conductor, and a dielectric mount. The axially compressible housing may be compressible in an axial direction at least 2.5% of an overall length of the axially compressible housing. The compressibility of the axially compressible housing may provide improved compliance in electrical assemblies. For example, when assembled within a PCB assembly, an array of bullet-type connectors may be arranged between two PCB boards. A minimum spacing distance may be required between mating connector reference planes for operation. That is, if a minimum spacing distance is not achieved, transmission of signals, or desired signal strength, between the PCB boards may not be achieved. Compression may be applied to the bullet-type connectors to reach the desired minimum spacing distance. Unfortunately, and as noted above, conventional bullet-type connectors are typically formed from very rigid materials which may be resistant to compression. For example, application of axial compression in traditional PCB assemblies incorporating conventional bullet-type connectors may result in damage to the housing of the connector (e.g., via cracking, buckling, or other deformation). Such damage may be further manifested in physical breakage of the bullet-type connector and/or disruption of PCB solder joints, having a deleterious effect on related system components. Moreover, where a minimum spacing distance is not achieved there may be a detrimental effect on signal performance.

Accordingly, by providing an axially compressible housing, the resilient nature of the axially compressible housing allows for some compression to occur without damage to the connection or related components. That is the resilience of the bullet-type connector, as described, herein takes up at least some of the manufacturing tolerances inherent in production of the bullet-type connectors and/or other components of the PCB assembly. Moreover, compressibility of the axially compressible housing takes up mechanical stress and thereby reduces force translated to adjacent, potentially delicate components in the PCB assembly. Various embodiments of the bullet-type connector, PCB assemblies, and methods of assembly, will be described in greater detail herein.

Figure 1A:
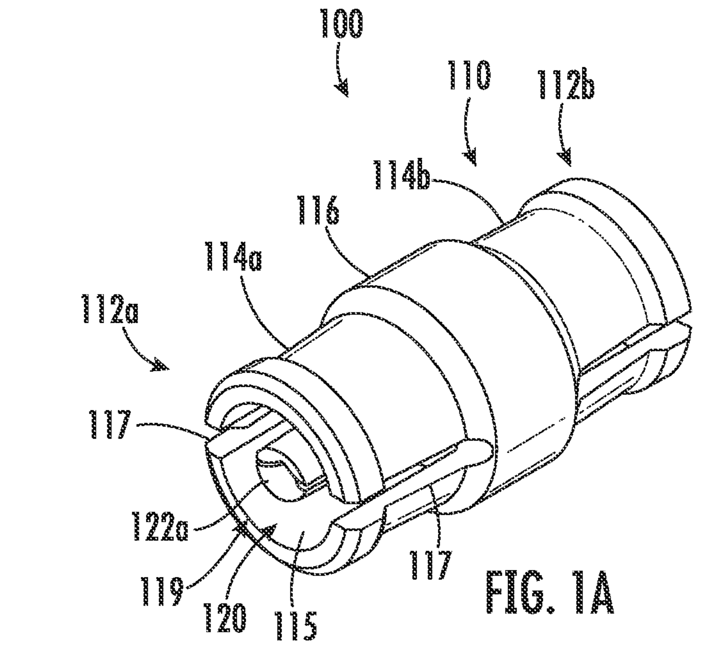
FIG. 1A schematically depicts an orthographic view of a bullet-type connector, according to one or more embodiments shown and described herein.
Figure 1B:
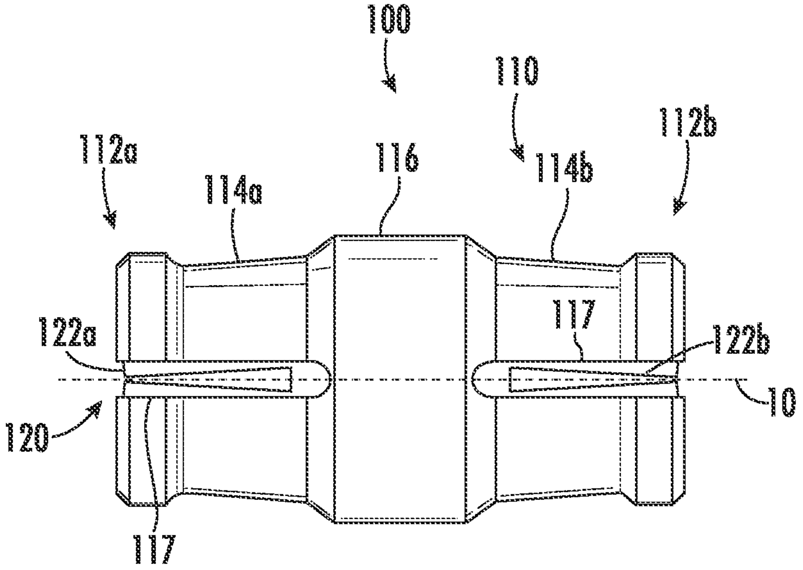
FIG. 1B schematically depicts a side view of the bullet-type connector of FIG. 1A, according to one or more embodiments shown and described herein.
Figure 1C:
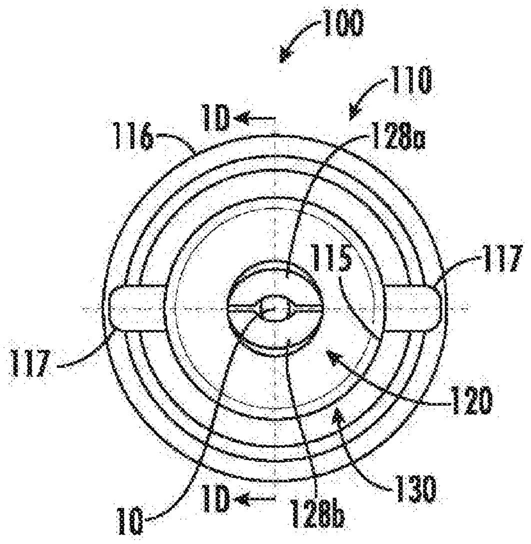
FIG. 1C schematically depicts an axial view of the bullet-type connector of FIG. 1A, according to one or more embodiments shown and described herein.
Figure 1D:
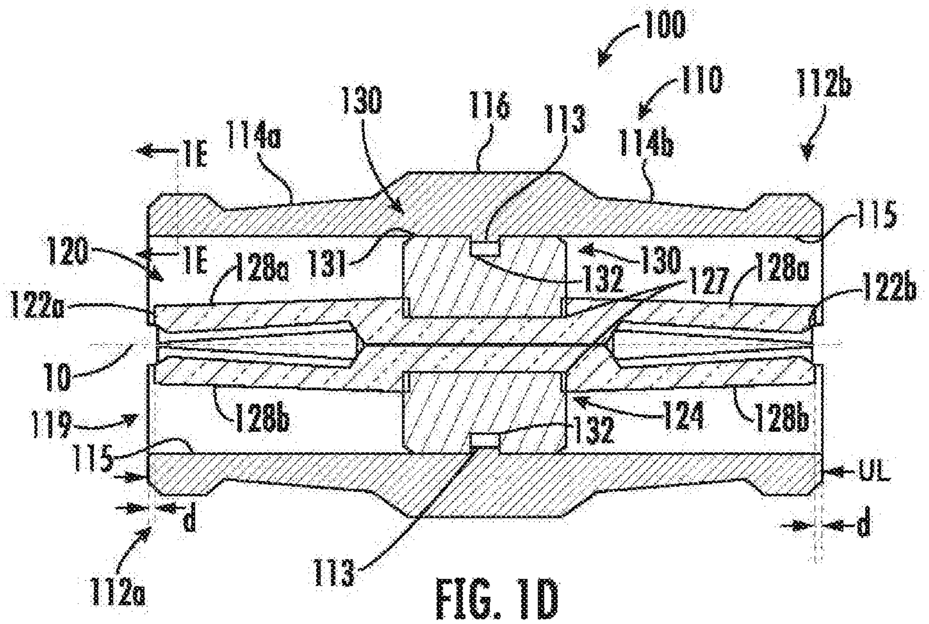
FIG. 1D schematically depicts a cross-sectional view taken along line 1D-1D of FIG. 1C, according to one or more embodiments shown and described herein.

Referring now to FIGS. 1A-1E a bullet-type connector 100 is generally depicted. As used herein, a bullet-type connector 100 may also be referred to as a coaxial connector, blind-mate connector, or the like, which may be used to transmit electrical signals (e.g., radiofrequency (RF), microwave, or the like). The bullet-type connector 100 generally includes an axially compressible housing 110, a central conductor 120, and a dielectric mount 130 (as depicted in FIGS. 1C and 1D). In embodiments, the bullet-type connector 100 may have a greater or fewer number of components without departing from the scope of the present disclosure. It is noted that the bullet-type connector 100 may define a central connection axis 10 extending therethrough, such as through a center of the bullet-type connector 100. Moreover, as used herein all references to the term "axially compressible" is defined as compression in an axial direction with respect to central connection axis 10.

The axially compressible housing 110 may generally extend azimuthal around the central connection axis 10. In embodiments, the axially compressible housing 110 may be generally cylindrical, though other shapes (e.g., cubic, rectangular, hexagonal, octagonal, etc.) are contemplated and possible. The axially compressible housing 110 may define a first end 112*a* and a second end 112*b* opposite the first end 112*a* and a lumen 119 extending from first end 112*a* to the second end 112*b* such that both the first end 112*a* and the second end 112*b* are open to receive a male connector, as will be described in greater detail herein.

The axially compressible housing 110 may define one or more housing slits 117 (e.g., two or more housing slits, three or more housing slits, four or more housing slits, etc.) formed therein and extending from the first end 112*a*, the second end 112*b*, or both to a central hub 116. The one or more housing slits 117 may provide radial compliance to the axially compressible housing 110, which may assist with axial compression and allow for flexible radial connections between the first end 112*a*, the second end 112*b*, or both, and a male or other type connector. The size of the one or more housing slits 117 may be based on the amount of desired engagement force. The one or more housing slits 117 may be evenly or unevenly distributed about the central connection axis 10.

The central hub 116 may be arranged between the first end 112*a* and the second end 112*b*. The axially compressible housing 110 may have an increased outer diameter at the central hub 116. In some embodiments, there may be another increased diameter region at the first end 112*a*, the second end 112*b*, or both. Transitions between regions of increased diameter may be stepped or sloped.

For example, the axially compressible housing 110 may include a first tapered portion 114*a* and a second tapered portion 114*b*, wherein an outer diameter of the first tapered portion 114*a* and the second tapered portion 114*b* taper from a first outer diameter to a second outer diameter smaller than the first outer diameter. For example, the first tapered portion 114*a* may extend between the central hub 116 and the first end 112*a* and the second tapered portion 114*b* may extend between the central hub 116 and the second end 112*b*. The taper of the first tapered portion 114*a* and the second tapered portion 114*b* may aid in connecting the axially compressible housing 110 to a connection. The tapering may improve manufacturability of the axially compressible housing 110 by requiring less material.

Referring to FIG. 1D, in embodiments, the lumen 119 may have substantially constant diameter between the first end 112*a* and the second end 112*b*. In some embodiments, the lumen 119 may have a changing diameter. In embodiments, one or more connecting projections 113 may extend radially inward from the axially compressible housing 110 to connect with the dielectric mount 130, described in greater detail below. For example, the one or more connecting projections 113 may extend radially inward at a longitudinally (axially) central location of the axially compressible housing 110. The one or more connecting projections 113 may include a single ring extending uninterruptedly around an interior wall 115 of the axially compressible housing 110. In some embodiments, multiple projections may be positioned along the interior wall 115.

The axially compressible housing 110 is axially compressible along the central connection axis 10. For example, the axially compressible housing 110 may be compressible in the axial direction at least 2.5% of an overall length of the axially compressible housing 110 along the central connection axis 10. In other embodiments, axially compressibility may be greater than or less than 2.5% of the overall length of the axially compressible housing 110. For example, axial compressibility may be between about 1% and about 10% of the overall length of the axially compressible housing 110, such as between about 2% and about 5%, such about between about 2.5% and about 4%, or the like.

Figure 1E:
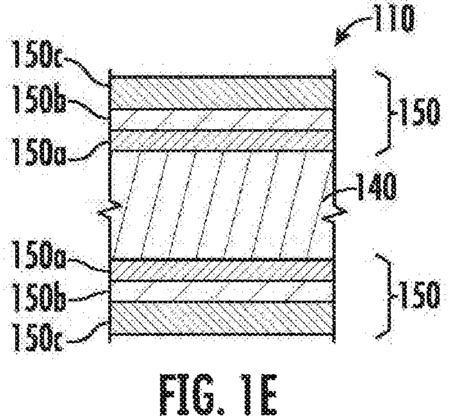
FIG. 1E, schematically depicts a cross-sectional view taken along line 1E-1E of FIG. 1D, according to one or more embodiments shown and described herein.

To facilitate axial compression the axially compressible housing 110 may be formed of one or more compressible materials. With reference to FIG. 1E, a cross section of the axially compressible housing 110 taken along line 1E-1E of FIG. 1D is generally depicted. In the illustrated embodiment, the axially compressible housing 110 includes a plastic body 140 coated with one or more conductive layers 150. It is noted that the various relative dimensions of the one or more conductive layers 150 are exaggerated for ease of depiction. For example, the plastic body 140 may be any plastic material capable of withstanding temperatures associated with conducting electrical (e.g., radiofrequency, microwave, or the like) signals. Example materials may include, but are not limited to, polypropylene, acrylonitrile butadiene styrene, polystyrene, nylon, polyethylene terephthalate, etc.

The one or more conductive layers 150 may include metal layers deposited on the plastic body 140. In embodiments, the one or more conductive layers 150 extend along all surfaces of the plastic body 140. In other embodiments, it is contemplated that the one or more conductive layers may only be deposited on portions of the plastic body 140 to define conductive pathways. The one or more conductive layers 150 may include any number of materials capable of conducting electrical (e.g., radiofrequency, microwave, etc.) signals. For example, the one or more conductive layers 150 may include copper, gold, silver, platinum, nickel, or the like. In some embodiments, such as illustrated in FIG. 1E, the one or more conductive layers 150 may include a first conductive layer 150*a*, a second conductive layer 150*b*, and/or a third conductive layer 150*c*, each of which may be a metallic layer. Accordingly, in embodiments the one or more conductive layers 150 may include at least two conductive layers, at least three conductive layers, or the like. In embodiments, each of the three conductive layers 150*a*, 150*b*, 150*c* may include a different metal. In one non-limiting embodiment, the first conductive layer 150*a* (e.g., the layer in contact with the plastic body 140) may include copper, the second conductive layer 150*b* may include nickel, and the third conductive layer 150*c* may include gold. However, other combinations are contemplated and possible.

In embodiments, the one or more conductive layers 150 are collectively at least 0.1 μm thick or greater in the radial direction, such as between about 1 μm and about 10 μm thick. In embodiments, each of the one or more conductive layers 150 is at least 0.1 μm thick or greater in the radial direction. In some embodiments, such as where there are three or more conductive layers, the first conductive layer 150*a* may be thinner than the second and third conductive layers 150*b*, 150*c*. In some embodiments, each conductive layer 150*a*-150*c* may be the same thickness. In one embodiment, the first conductive layer 150*a* (e.g., a copper layer) may be about 1.5 μm thick or less, the second conductive layer 150*b* (e.g., a nickel layer) may have a thickness of between about 1.5 μm and about 5 μm, and the third conductive layer 150*c* (e.g., a gold layer) may about 1 μm thick or less. However, other thicknesses are contemplated and possible without unduly the impacting the compressibility of the axially compressible housing 110.

The axially compressible housing 110 may be formed through any manufacturing technique. For example, in some embodiments the plastic body 140 may be formed via injection molding, compression, thermoforming, rotational molding, etc. Following formation of the plastic body 140, the plastic body 140 may be subjected to one or more coating procedures to apply the one or more conductive layers 150. For example, the one or more conductive layers 150 may be provided via metallization (e.g., sputtering, coating, or other deposition techniques).

Referring to FIG. 1D, the central conductor 120 may be positioned radially within the axially compressible housing 110. For example, the central conductor 120 may extend concentrically within the axially compressible housing 110 along the central connection axis 10. In embodiments the central conductor 120 defines first female connecting end 122*a* and a second female connecting end 122*b* opposite the first female connecting end 122*a*. As depicted in FIG. 1D, in an uncompressed configuration, having an overall end-to-end length of UL, the axially compressible housing 110 extends longitudinally beyond the first female connecting end 122*a* and the second female connecting end 122*b* of the central conductor 120 by a distance, d. Accordingly, the axially compressible housing 110 may be axially compressed without axially compressing the central conductor 120.

In embodiments, the central conductor 120 may be formed from a conductive material such as, but not limited to, gold, nickel, silver, copper, etc. In embodiments the central conductor 120 may be a solid metal material, which may be formed via casting, additive manufacturing, etc. In some embodiments, the central conductor 120 may be a metal material and have one or more coatings applied thereto (e.g., gold, copper, etc.).

The central conductor 120 may be have a central conductor hub 124 from which the first female connecting end 122*a* and the second female connecting end 122*b* extend. The central conductor hub 124 may define a recess 127 for receiving the dielectric mount 130, as will be described in greater detail below. Each of the first female connecting end 122*a* and the second female connecting end 122*b* may define two or more fingers 128*a*, 128*b*. The two of more fingers 128*a*, 128*b* may be tapered along the central connection axis 10 such that the first female connecting end 122*a* and the second female connecting end 122*b* each taper from a first diameter at the central conductor hub 124 to a second diameter, smaller than the first diameter. Separation between the two or more fingers 128*a*, 128*b*, may provide radial flexibility to the first female connecting end 122*a* and the second female connecting end 122*b* to allow the first female connecting end 122*a* and the second female connecting end 122*b* to clamp onto a received male mating feature (such as a first or second male conductive element 210*a*, 210*b*, described in greater detail below). With reference to FIG. 1C, is it noted that the central conductor 120 may be a substantially round or ovular axial shape, however, other shapes are contemplated and possible.

Referring to FIGS. 1C and 1D, the dielectric mount 130 couples the central conductor 120 to the axially compressible housing 110. For example, the dielectric mount 130 may be compressed between the central conductor 120 and the axially compressible housing 110. In embodiments, the dielectric mount 130 may be positioned within the recess 127 of the central conductor 120. The dielectric mount 130 may define one or more mating niches 132 configured to receive and mate with the one or more connecting projections 113 of the axially compressible housing 110. The one or more mating niches 132 may include a single ring extending uninterruptedly around an exterior surface 131 of the dielectric mount 130. In some embodiments, multiple niches may be positioned about the exterior surface 131 of the dielectric mount 130. Accordingly, the dielectric mount 130 may maintain a position of the central conductor 120 within the axially compressible housing 110. In some embodiments, it is noted that the dielectric mount 130 may be mated to the axially compressible housing 110 and the central conductor 120 through other means in addition to or in lieu of that described above. For example, the dielectric mount 130 may be mounted to the axially compressible housing 110 and/or the central conductor 120 via one or more adhesives, fasteners, interlocking components, or the like.

The dielectric mount 130 may be made from any dielectric material which isolates or prevents, electrical conduction between the axially compressible housing 110 and the central conductor 120. Dielectric materials include, but are not limited to Teflon, polyethylene, polyimide, polypropylene, polystyrene, etc.

Figure 2A:
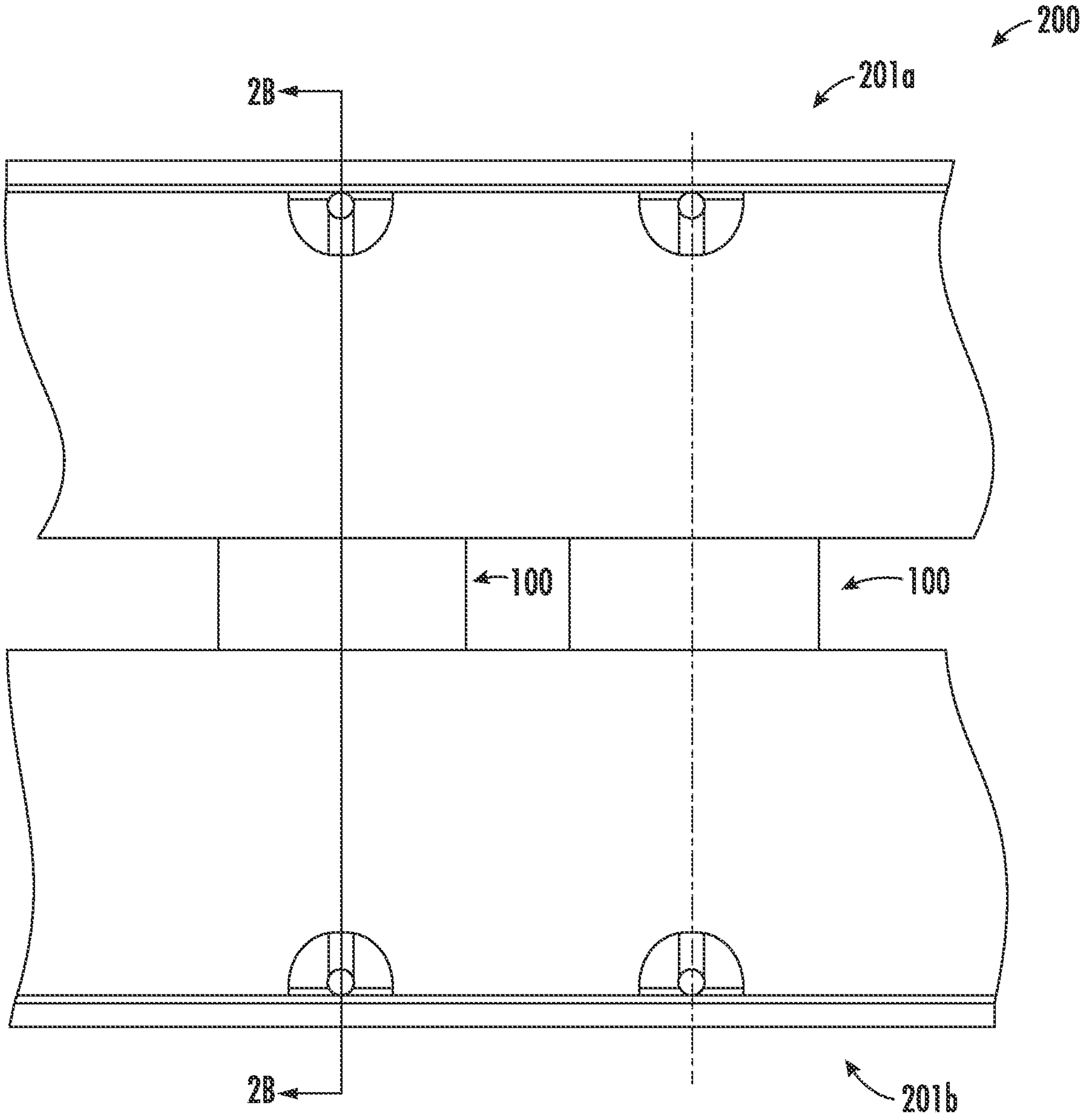
FIG. 2A schematically depicts a PCB assembly, according to one or more embodiments shown and described herein.
Figure 2B:
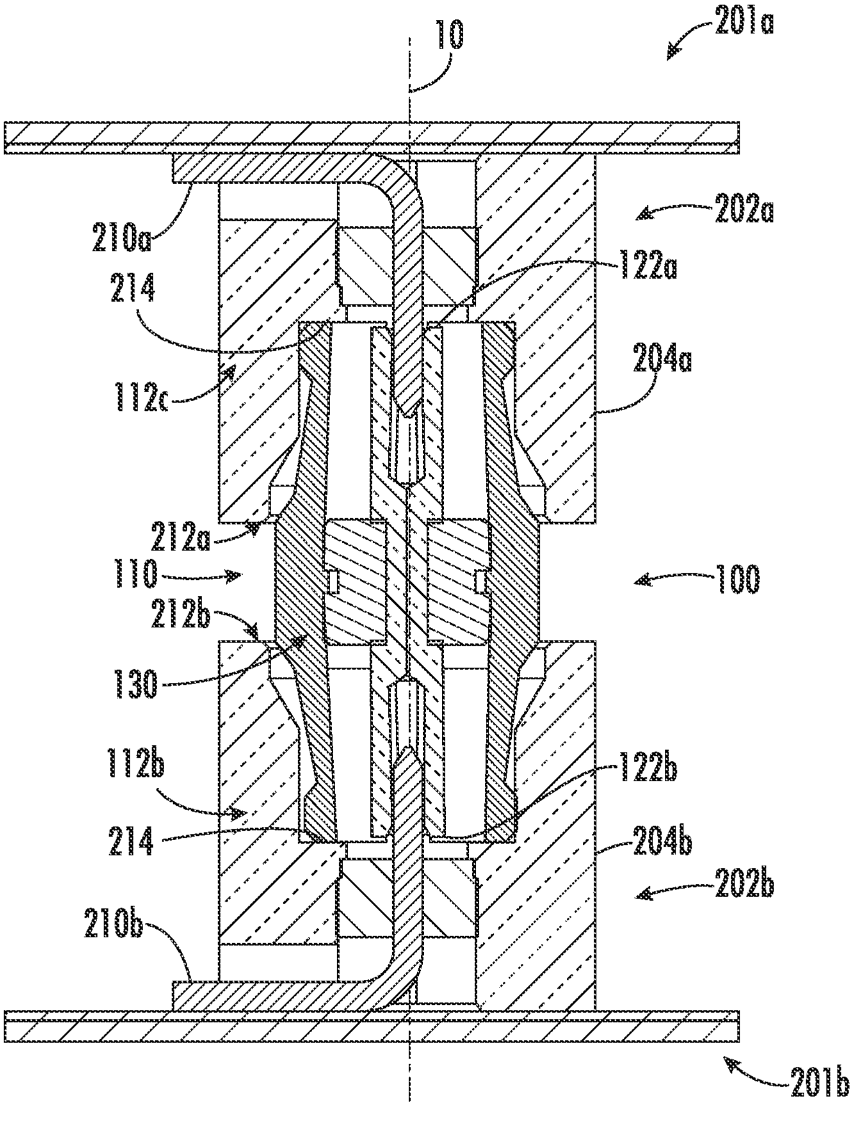
FIG. 2B schematically depicts a cross-sectional view of the PCB assembly of FIG. 2A taken on line 2B-2B of FIG. 2A, according to one or more embodiments shown and described herein.

Referring now to FIG. 2A, a PCB assembly 200 is schematically depicted. The PCB assembly 200 may be used for transmitting electrical (e.g., microwave, radiofrequency, etc.) signals between a first PCB 201*a* and a second PCB 201*b*. FIG. 2B depicts a cross-section of the PCB assembly 200 taken along line 2B-2B of FIG. 2A. The first PCB 201*a* includes a first male connector 202*a* and the second PCB 201*b* includes a second male connector 202*b*. Each of the first male connector 202*a* and the second male connector 202*b* includes male conduction element. For example, the first male connector 202*a* includes a first male conduction element 210*a* (e.g., a wire) and the second male connector 202*b* includes a second male conduction element 210*b* (e.g., a wire). The first and second male connectors 202*a*, 202*b* may further include a connector housing 204*a*, 204*b* which surround the respective first and second male conduction elements 210*a*, 210*b* and define a port 212*a*, 212*b* into which the first end 112*a* and the second end 112*b* of the axially compressible housing 110 is received such as depicted. It is noted that in embodiments, the one or more conductive layers 150 of the axially compressible housing 110 may be in contact with the connector housing 204*a*, 204*b*. In embodiments, the one or more conductive coatings 150 (depicted in FIG. 1E) of the axially compressible housing 110 in contact with the connector housing 204*a*, 204*b* may provide a conductive ground pathway.

In the depicted embodiment, the axially compressible housing 110 is depicted as fully seated within the first connector housing 204*a* and the second connector housing 204*b* and the first male conduction element 210*a* is positioned within the first female connecting end 122*a* of the central conductor 120 and the second male conduction element 210*b* is positioned within the second female connecting end 122*b* of the central conductor 120. Accordingly, an electrical pathway from the first male conduction element 210*a* to the central conductor 120 and through the second male conduction element 210*b* is completed, and the ground electrical pathway between the connector housing 204*a*, 204*b* and the axially compressible housing 110 is also completed.

Bullet-type connectors according to the present disclosure may be operated to transfer signals at a variety of frequencies. Bullet-type connectors as described herein were subjected to an axial compression test to determine a voltage standing wave ratio (VSWR). During testing, a bullet-type connector was subjected to axial compression and subjected to an electrical signal. It was measured that, in at least some embodiments of the present disclosure, the bullet-type connector 100 may have a substantially stable VSWR (e.g., less than 1.2 VSWR, such as less than about 1.15 VSWR) for signal frequencies between about 0 GHz and 25 GHz, such as between about 0 and 20 GHz, such as less than about 20 GHz for an axial compression of between about 25 μm to about 130 μm. However, it is noted that greater frequencies and/or compression amounts are contemplated and possible.

As noted hereinabove, PCBs may include an array of male connectors such that an array of bullet-type connectors connect the first PCB to the second PCB. Inherent engineering tolerances may make it difficult to adequately align and meet minimal spacing requirements between the array of bullet-type connectors and the PCBs. The embodiments provided here provide for axially compressibility to allow the bullet-type connectors to absorb some misalignment which may otherwise result from variations that occur during manufacturing.

Figure 3A:
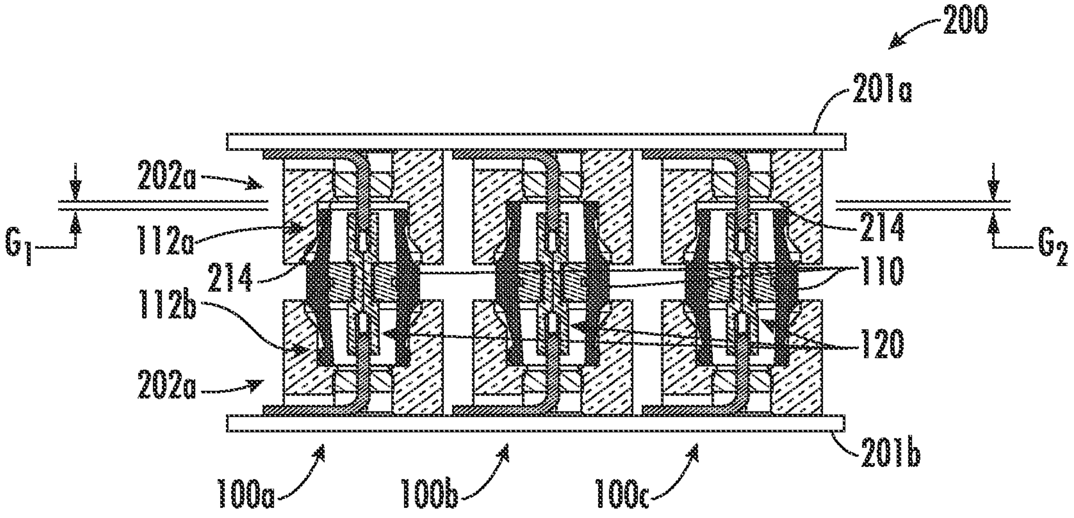
FIG. 3A generally depicts a first assembled orientation of a PCB assembly, according to one or more embodiments shown and described herein.

Methods of assembling a PCB assembly 200 are also disclosed herein. It is noted that methods may include a greater or fewer number of steps, in any order, without departing from the scope of the present disclosure. For example, the method includes attaching the first PCB 201*a* including a first plurality of male connectors 202*a* to a first end of the plurality of bullet-type connectors 100*a*-100*c*. For example, as illustrated in FIG. 3A, the first PCB 201*a* includes three first male connectors 202*a* and a bullet-type connector 100*a*, 100*b*, 100*c* connected to each. The method further includes attaching the second PCB 201*b* including a second plurality of male connectors 202*b* to a second end 112*b* of the plurality of bullet-type connectors 100*a*-100*c*. Again referring to FIG. 3A, the second PCB 201*b* includes three second male connectors 202*b* and the second end 112*b* of the bullet-type connectors 100*a*-100*c* are connected to each other, such that the bullet-type connectors 100 are sandwiched between the first PCB 201*a* and the second PCB 201*b*.

As illustrated in FIG. 3A, due to length variations which may result during manufacturing of the bullet-type connectors 100*a*-100*c*, some of the bullet-type connectors (e.g., the central bullet-type connector 100*b*) may be fully seated within both the first male connector 202*a* and the second male connector 202*b*, while adjacent bullet-type connectors (e.g., left bullet-type connector 100*a* and right bullet-type connector 100*c*) are prevented from fully seating within their respective male connectors 202*a*, 202*b* due to the length difference between the central bullet-type connector 100*b* relative to the left and right bullet-type connectors 100*a*, 100*c*. Accordingly, a gap, $G_1$ and $G_2$ is shown between the left and right bullet-type connectors 100*a*, 100*c* and a base surface 214 (e.g., reference plane) of the first male connector 202*a*. Such spacing may violate minimum spacing requirements for the PCB assembly 200 which may lead to poor connections and/or usability of the PCB assembly 200. Conventional rigid, bullet-type connectors 100 would not be able to be compressed for risk of damaging either the connector and/or the delicate components of the either PCB.

Figure 3B:
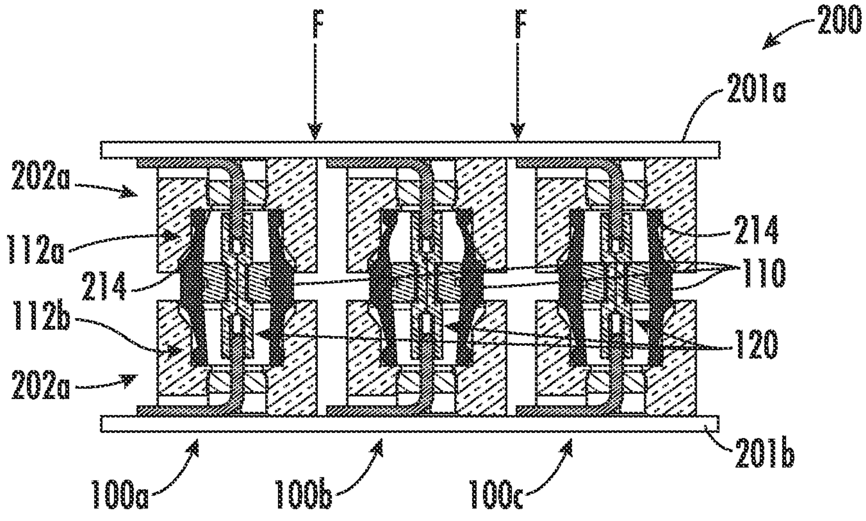
FIG. 3B generally depicts a second assembled orientation of the PCB assembly of FIG. 3A, according to one or more embodiments shown and described herein.

However, in the present embodiments, each of the bullet-type connectors 100 include an axially compressible housing 110. Accordingly, methods according to the present disclosure may further include compressing (e.g., via force F) one or more of the plurality of bullet-type connectors 100 between the first PCB 201*a* and the second PCB 201*b* to meet a predetermined fitting condition of the plurality of bullet-type connectors 100 with the first PCB 201*a* and the second PCB 201*b*, such as illustrated in FIG. 3B. For example, force F may be applied to the first PCB 201*a*, the second PCB 201*b*, or other to axially compressible one or more of the bullet-type connectors 100. The fitting condition may be a minimum spacing between bullet-type connectors and the first PCB 201*a* and/or the second PCB 201*b*. In some embodiments, the fitting condition may be a minimum spacing between any bullet-type connector 100 and the first PCB 201*a* and/or the second PCB 201*b*. For example, and minimum spacing condition may be based on a minimum amount of contact between the first male connectors 202*a* and/or the second male connectors 202*b* with the bullet-type connectors 100, such as the central conductors 120 of the bullet-type connectors 100*a*-100*c* and/or the axially compressible housings 110. As illustrated in FIG. 3B, the gaps, $G_1$ and $G_2$ are substantially eliminated by via compression of the axially compressible housing 110 of the central bullet-type connector 100*b*.

It should now be understood that embodiments of the present disclosure are directed to bullet-type connectors that generally include an axially compressible housing, a central conductor, and a dielectric mount. The axially compressible housing may be compressible in an axial direction at least 2.5% of an overall length of the axially compressible housing. The compressibility of the axially compressible housing may provide improved compliance in electrical assemblies. Particularly, the resilient nature of the axially compressible housing allows for some compression to occur without damage to the connection or related components. That is the resilience takes up at least some of the manufacturing tolerances inherent in production the bullet-type connectors and/or other components of the PCB assembly. Moreover, compressibility of the axially compressible housing takes up mechanical stress and thereby reduces force translated to adjacent, potentially delicate components in the PCB assembly.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A bullet-type connector comprising:

an axially compressible housing, a central conductor, and a dielectric mount, wherein:

the axially compressible housing is reversibly compressible in an axial direction at least 2.5% of an overall length of the axially compressible housing;

the central conductor defines a first female connecting end and a second female connecting end, the central conductor being positioned within the axially compressible housing; and the dielectric mount mounts the central conductor within the axially compressible housing.

2. The bullet-type connector of claim 1, wherein the axially compressible housing comprises a plastic body coated with one or more conductive layers.

3. The bullet-type connector of claim 1, wherein the axially compressible housing comprises at least two sides and wherein each sides comprises a coating.

4. The bullet-type connector of claim 2, wherein the one or more conductive layers comprise copper, nickel, gold, or any combination thereof.

5. The bullet-type connector of claim 2, wherein the one or more conductive layers are at least 0.1 μm thick or greater.

6. The bullet-type connector of claim 2, wherein the one or more conductive layers comprise at least two metallic layers.

7. The bullet-type connector of claim 1, wherein the axially compressible housing extends longitudinally beyond the first female connecting end and the second female connecting end of the central conductor.

8. The bullet-type connector of claim 1, wherein the axially compressible housing comprises a first tapered portion and a second tapered portion, wherein a diameter of the first tapered portion and a diameter of the second tapered portion tapers from a first diameter to a second diameter smaller than the first diameter.

9. The bullet-type connector of claim 1, wherein:
the axially compressible housing comprises a plastic body coated with one or more conductive layers; and
the axially compressible housing extends longitudinally beyond the first female connecting end and the second female connecting end of the central conductor.

10. The bullet-type connector of claim 1, wherein:
the axially compressible housing comprises a plastic body coated with one or more conductive layers; and
the axially compressible housing comprises a first tapered portion and a second tapered portion, wherein a diameter of the first tapered portion and a diameter of the second tapered portion tapers from a first diameter to a second diameter smaller than the first diameter.

11. The bullet-type connector of claim 1, wherein:
the axially compressible housing extends longitudinally beyond the first female connecting end and the second female connecting end of the central conductor; and
the axially compressible housing comprises a first tapered portion and a second tapered portion, wherein a diameter of the first tapered portion and a diameter of the second tapered portion tapers from a first diameter to a second diameter smaller than the first diameter.

12. The bullet-type connector of claim 1, wherein:
the axially compressible housing comprises a plastic body coated with one or more conductive layers; and
the axially compressible housing extends longitudinally beyond the first female connecting end and the second female connecting end of the central conductor; and
the axially compressible housing comprises a first tapered portion and a second tapered portion, wherein a diameter of the first tapered portion and a diameter of the second tapered portion tapers from a first diameter to a second diameter smaller than the first diameter.

13. A printed circuit board (PCB) assembly, comprising a first PCB, a second PCB, and a bullet-type connector, wherein:
the first PCB comprises a first male connector;
the second PCB comprises a second male connector;
the bullet-type connector comprises:
an axially compressible housing compressible in an axial direction at least 2.5% of an overall length of the axially compressible housing;
a central conductor defining a first female connecting end connected to the first male connector and a second female connecting end connected to the second male connector, the central conductor being positioned within the axially compressible housing; and
a dielectric mount mounting the central conductor within the axially compressible housing.

14. The PCB assembly of claim 13, wherein the first PCB is arranged parallel to the second PCB and the bullet-type connector extends between the first PCB and the second PCB.

15. The PCB assembly of claim 13, wherein the first PCB and the second PCB axially compress the bullet-type connector therebetween.

16. A method of assembling a printed circuit board (PCB) assembly comprising a first PCB, a second PCB, and a plurality of bullet-type connectors, the method comprising:
attaching the first PCB including a first plurality of male connectors to a first end of the plurality of bullet-type connectors;
attaching the second PCB including a second plurality of male connectors to a second end of the plurality of bullet-type connectors; and
axially compressing one or more of the plurality of bullet-type connectors between the first PCB and the second PCB to meet a predetermined fitting condition of the plurality of bullet-type connectors with the first PCB and the second PCB,
wherein the attaching the first PCB to the plurality of bullet-type connectors comprises inserting the first plurality of male connectors into a first female connecting end of a central conductor of the plurality of bullet-type connectors; and
the attaching the second PCB to the plurality of bullet-type connectors comprises inserting the second plurality of male connectors into a second female connecting end of the central conductor of the plurality of bullet-type connectors.

17. The method of claim 16, wherein the predetermined fitting condition comprises a minimum spacing of the plurality of bullet-type connectors to the first PCB and the second PCB.

18. The method of claim 16, wherein the one or more of the plurality of bullet-type connectors comprise an axially compressible housing compressible in an axial direction at least 2.5% of an overall length of the axially compressible housing.

19. The method of any of claim 16, wherein each of the plurality of bullet-type connectors comprises:
an axially compressible housing compressible in an axial direction at least 2.5% of an overall length of the axially compressible housing;
a central conductor defining a first female connecting end and a second female connecting end, the central conductor being positioned radially within the axially compressible housing; and
a dielectric mount mounting the central conductor within the axially compressible housing.

* * * * *